United States Patent
Dalmiya et al.

(10) Patent No.: US 11,564,125 B2
(45) Date of Patent: Jan. 24, 2023

(54) BUFFER STATUS REPORT PREDICTION

(71) Applicant: QUALCOMM Incorporated, San Diego, CA (US)

(72) Inventors: Vishal Dalmiya, San Diego, CA (US); Vaishakh Rao, San Diego, CA (US); Kuo-Chun Lee, San Diego, CA (US); Leena Zacharias, San Jose, CA (US); Vanitha Aravamudhan Kumar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 80 days.

(21) Appl. No.: 16/945,550

(22) Filed: Jul. 31, 2020

(65) Prior Publication Data
US 2022/0038945 A1    Feb. 3, 2022

(51) Int. Cl.
| | |
|---|---|
| *H04W 28/02* | (2009.01) |
| *H04W 72/04* | (2009.01) |
| *G06N 20/00* | (2019.01) |
| *H04L 5/14* | (2006.01) |
| *H04W 28/06* | (2009.01) |
| *H04W 72/14* | (2009.01) |

(52) U.S. Cl.
CPC ........ *H04W 28/0278* (2013.01); *G06N 20/00* (2019.01); *H04L 5/1469* (2013.01); *H04W 28/06* (2013.01); *H04W 72/0446* (2013.01); *H04W 72/14* (2013.01)

(58) Field of Classification Search
CPC ............. H04W 28/0278; H04W 28/06; H04W 72/0446; H04W 72/14; G06N 20/00; H04L 5/1469
See application file for complete search history.

(56) References Cited

U.S. PATENT DOCUMENTS

| | | | |
|---|---|---|---|
| 8,547,917 B2* | 10/2013 | Sun ................. | H04W 72/1242 370/329 |
| 2011/0300858 A1 | 12/2011 | Lee et al. | |
| 2013/0294337 A1 | 11/2013 | Damnjanovic et al. | |
| 2016/0262156 A1* | 9/2016 | Yilmaz ............... | H04W 72/082 |
| 2018/0049208 A1* | 2/2018 | Ozturk ................ | H04L 45/245 |
| 2018/0124764 A1* | 5/2018 | Lee .................... | H04W 72/0486 |
| 2018/0332507 A1* | 11/2018 | Fujishiro ............. | H04J 11/00 |
| 2018/0368166 A1* | 12/2018 | Jheng ................. | H04W 72/1284 |
| 2019/0053260 A1 | 2/2019 | Shaheen | |
| 2019/0110224 A1* | 4/2019 | Yasukawa ......... | H04W 28/0278 |
| 2019/0223040 A1 | 7/2019 | Lee et al. | |
| 2019/0357247 A1* | 11/2019 | Keskitalo ............. | H04W 72/14 |

(Continued)

FOREIGN PATENT DOCUMENTS

WO     2020116820 A1    6/2020

*Primary Examiner* — Christopher M Crutchfield
*Assistant Examiner* — Tito Q Pham
(74) *Attorney, Agent, or Firm* — Patterson & Sheridan, L.L.P

(57) ABSTRACT

Certain aspects of the present disclosure provide techniques for predicting an amount of uplink data to report in a buffer status report (BSR). A method that may be performed by a user equipment (UE) includes predicting a value of a parameter related to transmission of uplink data from the UE; determining an amount of uplink data to report in the BSR based on at least the predicted value of the parameter, and transmitting the BSR including an indication of the determined amount of uplink data.

30 Claims, 7 Drawing Sheets

(56) References Cited

U.S. PATENT DOCUMENTS

2020/0107220 A1\* 4/2020 Shreevastav ............ H03M 7/30
2021/0250804 A1\* 8/2021 Chen ................. H04W 72/1284
2021/0328722 A1\* 10/2021 Lin ................... H04W 72/0413
2021/0329694 A1\* 10/2021 Liu ....................... H04W 16/14
2021/0400526 A1\* 12/2021 Wu ................... H04W 28/0278

\* cited by examiner

BUFFER STATUS REPORT PREDICTION

INTRODUCTION

Field of the Disclosure

Aspects of the present disclosure relate to wireless communications, and more particularly, to techniques for predicting uplink data to report in a buffer status report (BSR).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless nodes (e.g., BSs and/or UEs) to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include predicting an amount of uplink data to report in a buffer status report.

Certain aspects provide a method for wireless communications by a user equipment (UE). The method generally includes predicting a value of a parameter related to transmission of uplink data from the UE, determining an amount of uplink data to report in a buffer status report (BSR) based on at least the predicted value of the parameter, and transmitting the BSR including an indication of the determined amount of uplink data.

Certain aspects provide an apparatus for wireless communications by a user equipment (UE). The apparatus generally includes at least one processor configured to predict a value of a parameter related to transmission of uplink data from the UE, determine an amount of uplink data to report in a buffer status report (BSR) based on at least the predicted value of the parameter, and transmit the BSR including an indication of the determined amount of uplink data. The apparatus may also include a memory coupled with the at least one processor Certain aspects provide an apparatus for wireless communications by a user equipment (UE). The apparatus generally includes means for predicting a value of a parameter related to transmission of uplink data from the UE, means for determining an amount of uplink data to report in a buffer status report (BSR) based on at least the predicted value of the parameter, and means for transmitting the BSR including an indication of the determined amount of uplink data.

Certain aspects provide a non-transitory computer-readable medium for wireless communications by a user equipment (UE). The non-transitory computer-readable medium comprises instructions that, when executed by at least one processor, cause the at least one processor to predict a value of a parameter related to transmission of uplink data from the UE, determine an amount of uplink data to report in a buffer status report (BSR) based on at least the predicted value of the parameter, and transmit the BSR including an indication of the determined amount of uplink data.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
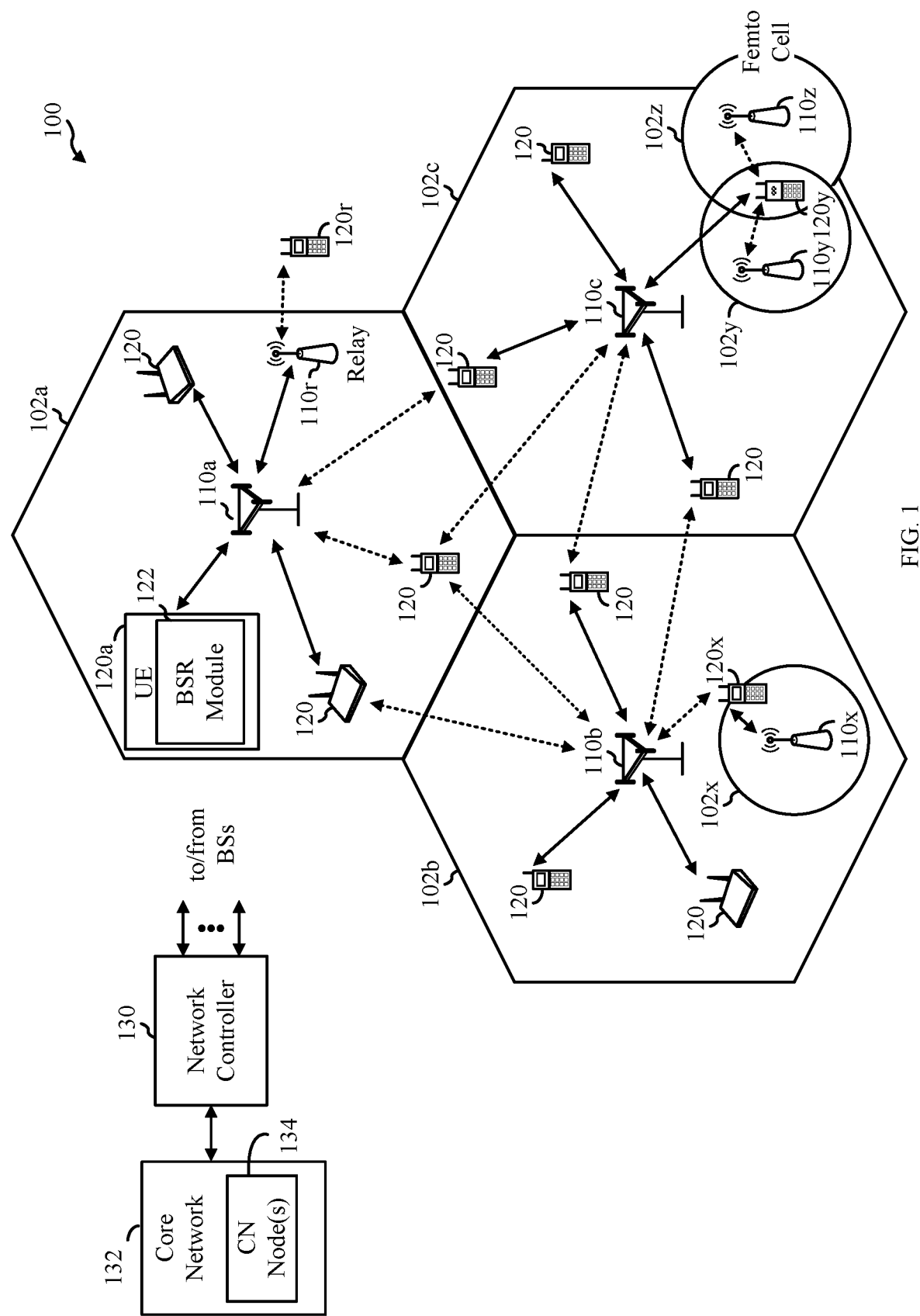
FIG. 1 is a block diagram conceptually illustrating an example telecommunications system, in accordance with certain aspects of the present disclosure.

Aspects of the present disclosure provide apparatus, methods, processing systems, and computer readable mediums for determining an amount of uplink data to report in a buffer status report (BSR). For example, in some cases, a user equipment (UE) may predict a value of a parameter related to transmission of uplink data from the UE. The UE may then use this predicted parameter to determine an amount of uplink data to report in the BSR. Accordingly, by predicting the value of the parameter, the reported amount of uplink data in the BSR may more accurately reflect the amount of UL data the UE will have for transmission. Accordingly, such prediction may also allow a base station to allocate a sufficient amount of UL resources for the UE to transmit the UL data, avoiding situations where the UE does not have enough UL data to fill the UL resources (e.g., leading to wasted resources) and/or situations where additional data arrives for transmission after transmission of the BSR (e.g., leading to increased latency associated with transmission of the additional data).

The following description provides examples of buffer status report prediction in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110*a*-*z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a*-*y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the UEs 120 may be configured for buffer status report prediction, as described herein. For example, as shown in FIG. 1, the UE 120*a* includes a buffer status report (BSR) module 122. The BSR module 122 may be configured to perform the operations illustrated in FIG. 7, as well as other operations described herein for determining an amount of uplink data to report in a BSR.

Figure 2:
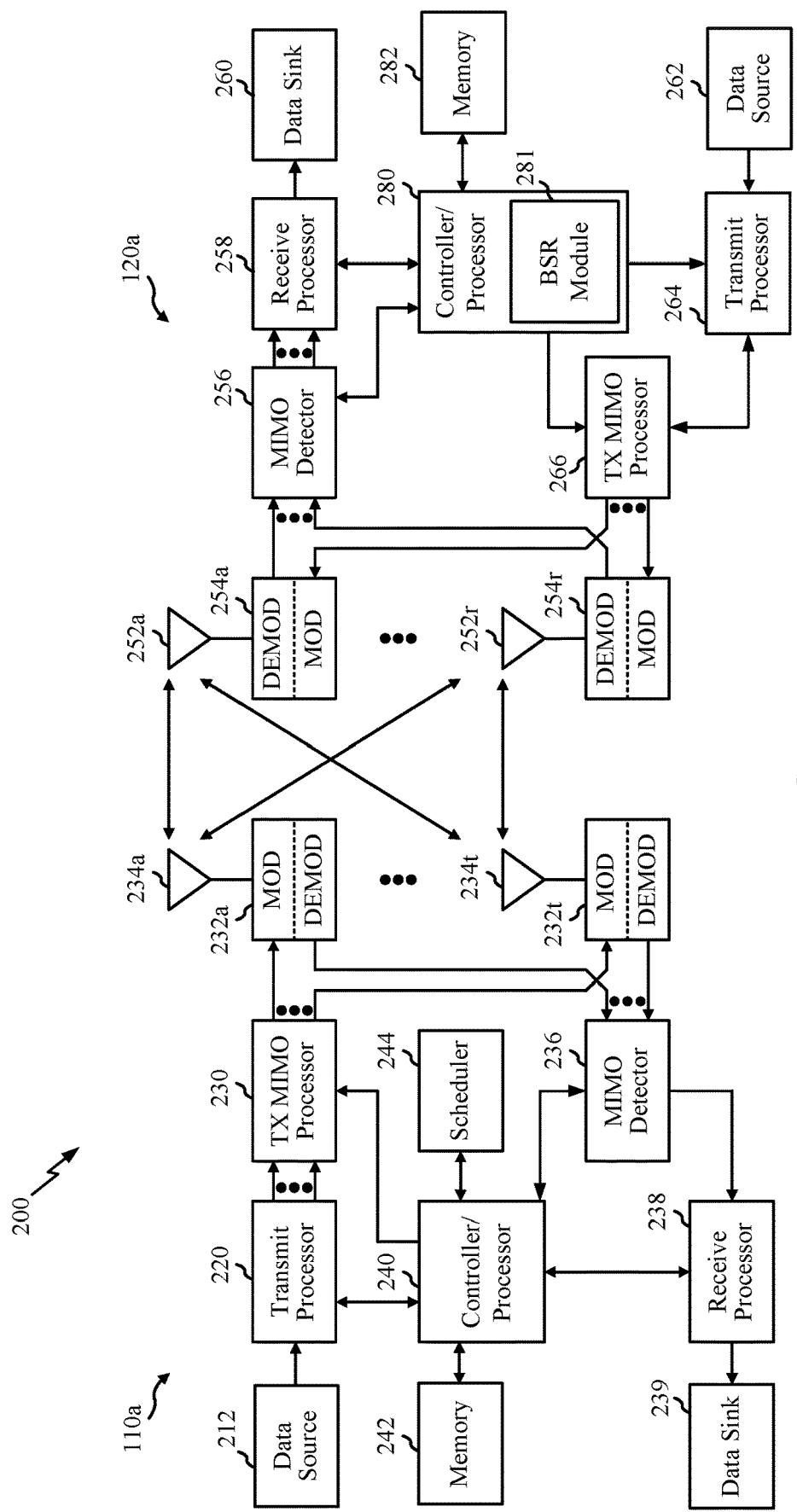
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 280 of the UE 120*a* includes buffer status report (BSR) module 281 may be configured to perform the operations illustrated in FIG. 7, as well as other operations described herein for determining an amount of uplink data to report in a BSR. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
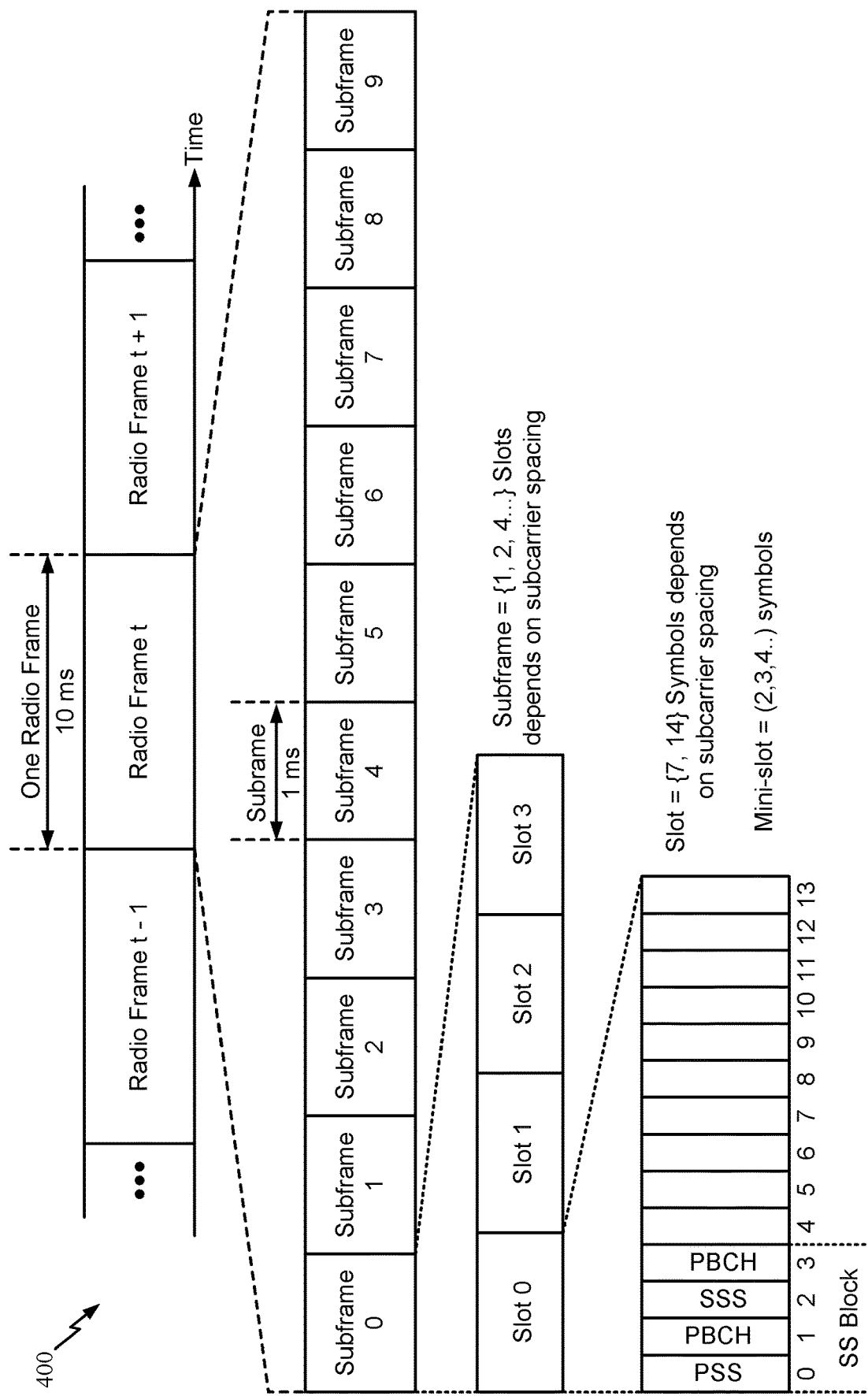
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Buffer Status Report Prediction

To send uplink (UL) data, a user equipment (UE) may transmit a buffer status report (BSR) to a base station, indicating an amount of uplink data residing in an uplink buffer of the UE needing to be transmitted. The BSR may assist the base station in determining an amount of resources to allocate to the UE to transmit the UL data. The UE may transmit one of two different types of BSRs, such as a long BSR or a short BSR. In some cases, the long BSR format may be used for providing a buffer size indication for a plurality of different logical channel groups (LCGs) while the short BSR may be used for providing a buffer size indication for a single LCG.

Figure 4:
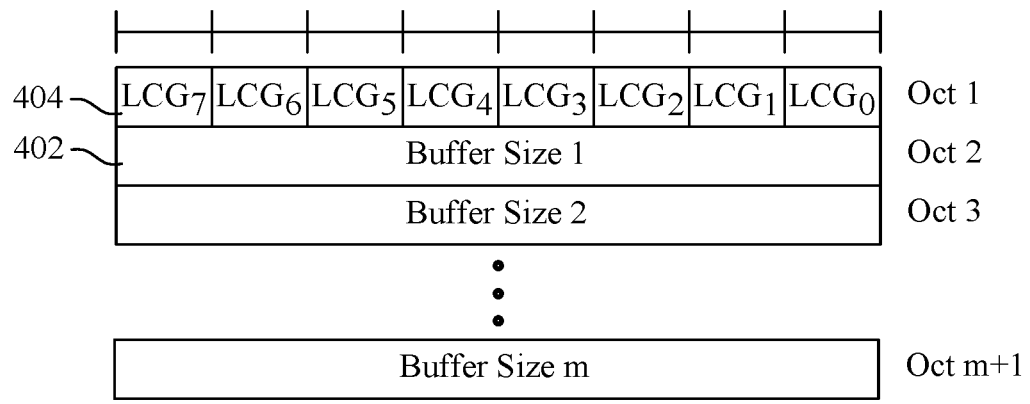
FIGS. 4-5 illustrate example buffer status report formats, in accordance with certain aspects of the present disclosure.

For example, FIG. 4 illustrates an example long BSR format. As illustrated in FIG. 4, the long BSR may include a plurality of buffer size indication fields 402 and a plurality of LCG fields. Each of the buffer size indication fields 402 may uniquely correspond to a different LCG field 404 and may indicate an amount of data residing in the uplink buffer of the UE for each different logical channel group. In some cases, buffer size indication field 402 may include an index value that may indicate the amount of data residing in the uplink buffer. In some cases, the index value may be used to look up a corresponding value in a look up table that indicates the amount of data residing in the uplink buffer in the UE.

Figure 5:
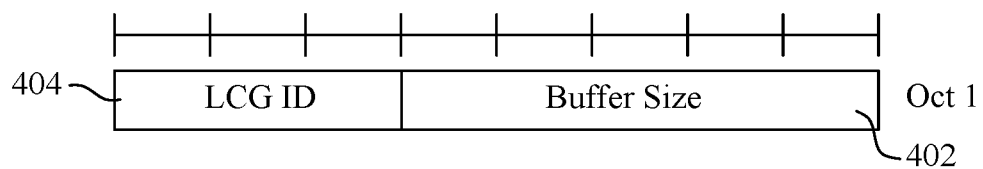

In contrast, FIG. 5 illustrates an example short BSR format. As illustrated, the short BSR format illustrated in FIG. 5 may only include a single buffer size indication field 402 and LCG field 404. As noted, the short BSR format may be used by the UE to provide a buffer size indication for a single, specific LCG.

Figure 6:
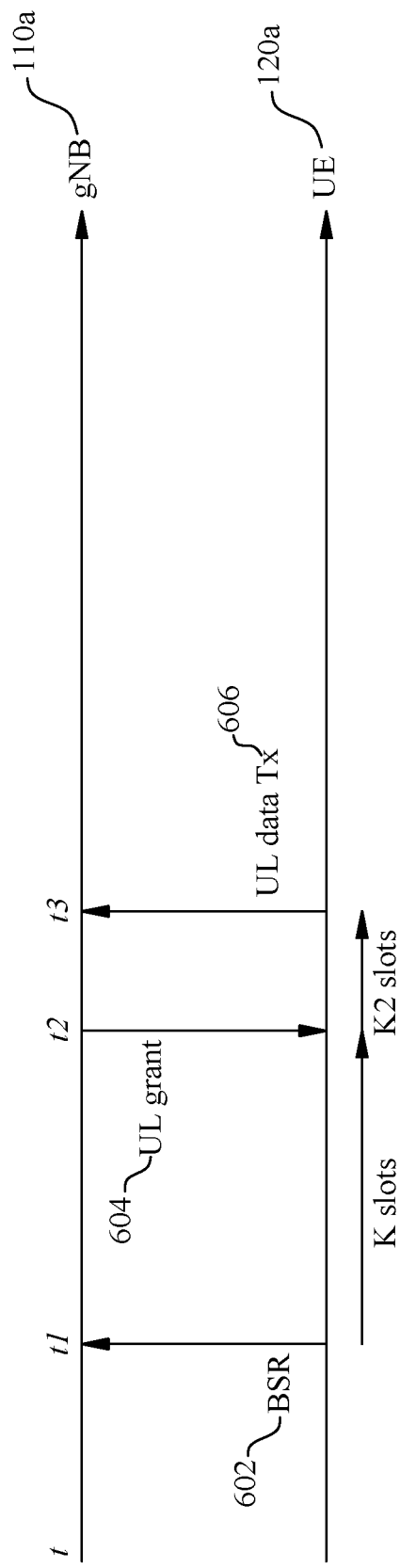
FIG. 6 shows an example resource allocation time line, in accordance with certain aspects of the present disclosure.

FIG. 6 shows an example resource allocation time line, illustrating the allocation of resources in response to a BSR from a UE. For example, as illustrated in FIG. 6, at time t1 the UE 120a may transmit a BSR 602 to the base station 110a (e.g., gNB), requesting an amount of resources to perform UL data transmissions 606. For example, in some cases, the BSR 602 may include one or more index values indicating an amount of UL data in an UL buffer of the UE needing to be transmitted. As noted above, each of the one or more index values may correspond to a different LCG, indicating the amount of UL data for transmission by the UE for that particular LCG.

Thereafter, the base station 110a may process the BSR 602 and allocate an amount of UL resources for the UL data transmissions 606 (e.g., resources for a physical uplink shared channel (PUSCH)) by the UE corresponding to the amount of resources requested in the BSR 602. In some cases, the base station 110a may allocate the bare minimum amount of UL resources to allow the UE 120a to transmit the UL data residing in the UL buffer of the UE 120a, if the resources are available. In other cases, if the resources are not available, the base station may allocate an amount of resources that is smaller than the amount of data residing in the buffer of the UE 120a.

Thereafter, as illustrated at t2, the base station 110a may transmit an UL grant 604 to the UE 120a, indicating the amount of/which UL resources have been allocated to the UE 120a for the UL data transmissions 606. As illustrated, a time period of "K slots" may be needed for the base station 110a to receive the BSR 602 and respond to the UE 120a with the UL grant 604. In other words, the UL grant 604 transmitted by the base station 110a at t2 may be K slots after the base station 110a receives the BSR 602 from the UE 120a at t1.

Thereafter, the UE 120a may process the received UL grant 604 and prepare the UL data transmissions 606 for transmission. In some cases, the base station 110a may signal a time delay (e.g., slot offset) indicating when the UE 120a may begin transmitting the UL data transmissions. As illustrated, the time delay may be in terms of a number of slots between reception of the UL grant 604 and the UL data transmission 606, denoted "K2 slots." Accordingly, after receiving the UL grant 604, the UE 120a may then transmit the UL data transmissions 606 at t3 (e.g., K2 slots after t2).

In some cases, however, the amount of resources that the UE 120a requests in the BSR 602 may not adequately reflect the amount of UL data that resides (or will reside) in the UL buffer of the UE 120a when the UE 120a begins transmitting the UL data transmissions 606, which may lead to wasted time and/or frequency resources and, in some cases, an increase in transmission latency for data residing in the UL buffer.

For example, in some cases, in the time between reception of the UL grant 604 at t2 and the UL data transmission 606 at t3, the UE may not be able to finish processing of all UL data in the buffer in order to fill all of the resources (e.g., a transport blocks) allocated to the UE 120a by the UL grant 604. In such cases, the UE 120a may need to fill a remaining portion of the transport blocks/resources with padding bytes (e.g., bytes of information that are irrelevant to the base station 110a), which may waste resources, such as bandwidth resources, processing resources, power resources, and the like.

Further, in some cases, in the time between transmission of the BSR 602 at t1 and reception of the UL grant 604 at t2, the UE 120a may not be able to finish processing of all UL data in the UL buffer due to having to compress IP packets in robust header compression (ROHC) and/or uplink data compression (UDC) or having to compute message authentication code-integrity (MAC-I) (e.g., if data radio bearer-integrity protection (DRB-IP) is configured) in order to create a PDCP packet. This may also lead to the UE having to transmit padding bytes, which may waste resources.

Additionally, in some cases, additional data may arrive (internally) at the buffer of the UE 120a for transmission to the base station 110a between transmission of the BSR 602 at t1 and reception of the UL grant 604 at t2. Traditionally, resources for this additional data would need to be requested in a future BSR, which may lead to increased latency associated with transmission of this additional data.

Accordingly, aspects of the present disclosure provide techniques for reducing wasted UL resources and the latency associated with transmitting UL data, as described above. For example, in some cases, aspects of the present disclosure provide techniques for predicting an amount of uplink data to be reported in the BSR to avoid situations in which the UE wastes resources by transmitting padding bits and situations where additional data arrives after transmission of the BSR. For example, in some cases, the UE may predict a value of a parameter related to transmission of UL data and may use this predicted value to more accurately report an amount of UL data in a BSR. Accordingly, when the UE goes to transmit the UL data transmissions, the UE may not need to transmit padding information to the base station nor wait for a new UL grant to transmit newly arrived data since the BSR accurately predicted the amount of data the UE would have for transmission at the time of transmission (e.g., K2 slots after receiving the UL grant).

Figure 7:
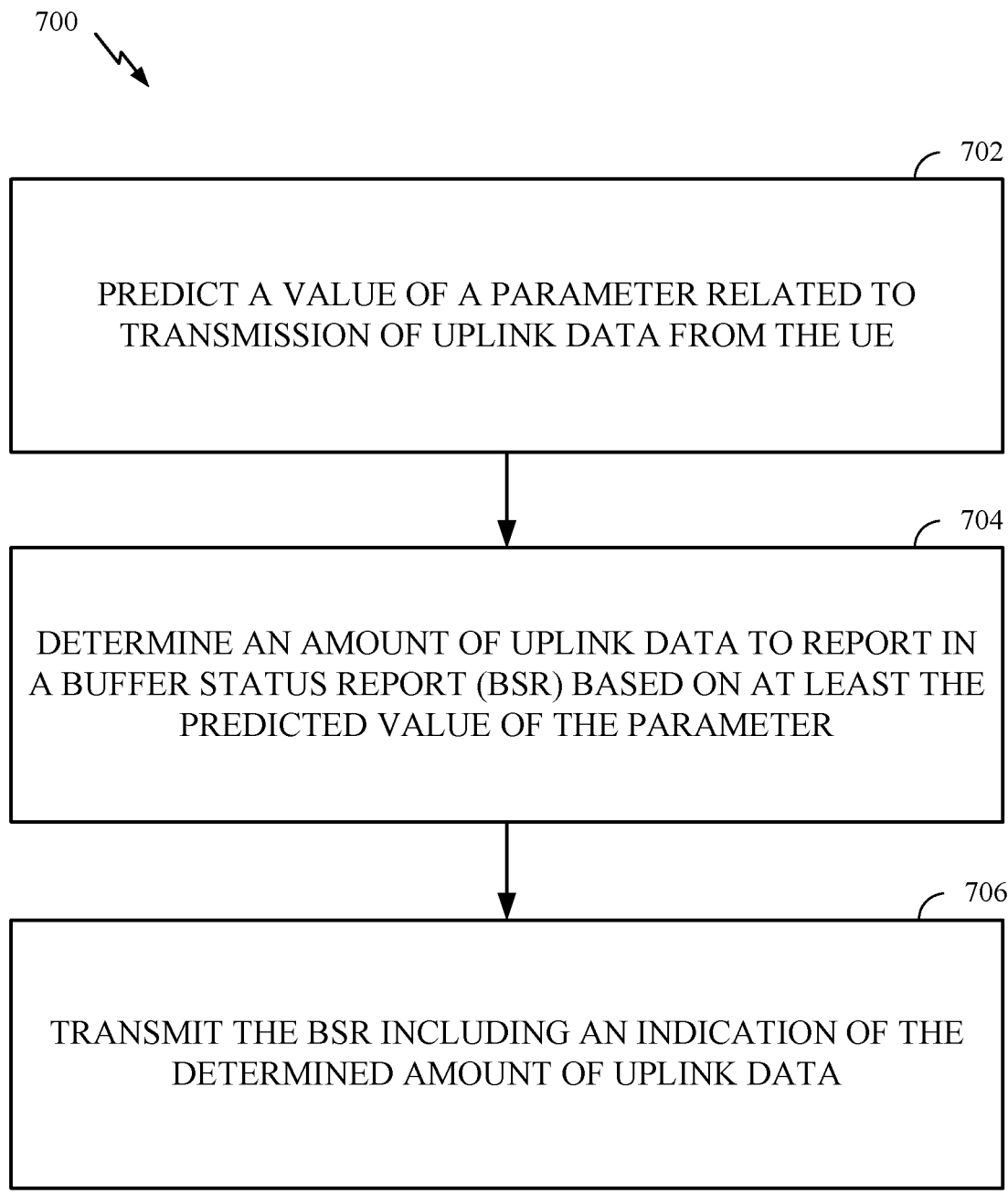
FIG. 7 is a flow diagram illustrating example operations for wireless communication by a UE, in accordance with certain aspects of the present disclosure.

FIG. 7 is a flow diagram illustrating example operations 700 for wireless communication, for example, for predicting an amount of uplink data to request in a BSR, in accordance with certain aspects of the present disclosure. The operations 700 may be performed, for example, by a wireless node (e.g., such as a UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, by predicting a value of a parameter related to transmission of uplink data from the UE. In some cases, the parameter related to the transmission of the uplink data may be predicted based on a machine learning algorithm. Additionally, as will be explained in greater detail below, in some cases, the parameter comprises at least one of: a slot offset indicating a number of slots between reception of an uplink grant and transmission of the uplink data, a number of slots occurring between transmission of the BSR and reception of an uplink grant or a rate of additional uplink data arriving between transmission of the BSR and reception of an uplink grant.

At 704, the wireless node determines an amount of uplink data to report in a buffer status report (BSR) based on at least the predicted value of the parameter. In some cases, as will be explained in greater detail below, the amount of uplink data to report may include a number of bytes of uplink data that the UE can process between reception of an uplink grant and transmission of the uplink data if the number of bytes of uplink data that the UE can process between reception of the uplink grant and transmission of the uplink data is less than an amount of uplink data in an UL buffer of the UE for transmission. In other cases, the amount of uplink data to report may include a number of bytes of uplink data that the UE can process prior to performing packet compression if the number of bytes of uplink data that the UE can process prior to performing packet compression is less than an amount of uplink data in an UL buffer of the UE for transmission. Additionally, in some cases, the amount of uplink data to report in the BSR may include a sum of an amount of uplink data in an UL buffer of the UE for transmission and an amount of uplink data predicted to arrive between transmission of the BSR and reception of an uplink grant.

At 706, the wireless node transmits the BSR including an indication of the determined amount of uplink data.

As noted above with reference to FIG. 6, in some cases, in the time between reception of the UL grant 604 at t2 and the UL data transmission 606 at t3, the UE may not be able to finish processing of all UL data in the UL buffer in order to fill all of the resources (e.g., a transport blocks) allocated to the UE 120a by the UL grant 604. As noted, such time between reception of the UL grant 604 and UL data trans-mission 606 may be controlled based on a slot offset parameter received in the UL grant 604 from the base station and may be denoted "K2 slots." Accordingly, if the UE were to know the value of slot offset parameter (e.g., K2 slots) before transmitting the BSR 602, the UE may be able to predict how much UL data it is able to process and take such information into account when determining the amount of resources to request in the BSR 602 to more accurately determine how much UL data the UE would have to transmit at the time of transmission (e.g., t3) and, therefore, how much data to report in the BSR 602.

For example, in some cases, as noted above, at 702 in FIG. 7, the UE may predict a value of a parameter related to transmission of UL data from the UE. In some cases, the parameter may comprise the slot offset (e.g., K2 slots), which indicates a number of slots between reception of an uplink grant 604 and transmission of the UL data 606. In other words, the UE may predict a value of the slot offset that the UE expects to receive in the UL grant 604, which may be denoted "pred_K2". Accordingly, pred_K2 may represent the number of slots that the UE is predicting will occur between reception of the UL grant 604 and the UL data transmissions 606. In some cases, the UE may predict the slot offset (e.g., pred_K2) based on a machine learning algorithm, which may take into account information such as previous slot offset values (e.g., previous K2 slot values), previous BSRs, and/or a time division duplexing (TDD) or frequency division duplexing (FDD) configuration.

The UE may then use the predicted slot offset value (e.g., pred_K2) to determine how much information the UE is able to process between reception of the UL grant 604 at t2 and the UL data transmissions 606 at t3. By knowing how much UL data the UE is able to process between reception of the UL grant 604 at t2 and the UL data transmissions 606 at t3 the UE may be able to request UL resources that more accurately reflect the amount of UL data that the UE has in the UL buffer for transmission at t3, avoiding situations where the UE does not have enough processed UL data to fill all of the allocated UL resources, as described above. For example, to determine how much information the UE is able to process between reception of the UL grant 604 at t2 and the UL data transmissions 606 at t3, the UE may first determine a processing speed of the UE (R1) from a bench mark measurement, which may be in terms of number of data bytes per slot. In some cases, R1 may depend on current status of the UE, such as clock rates, data compression in memory turned on/off, and the like.

Accordingly, by knowing the processing speed of the UE (e.g., R1), the UE may be able to calculate a number of bytes of UL data (B1) that the UE can process between reception of the UL grant 604 at t2 and the UL data transmissions 606 at t3. For example, the UE may calculate the number of bytes of UL data (B1) that the UE can process according to: B1=pred_K2*R1.

Accordingly, the UE may then determine, at 704 in FIG. 7, the amount of UL data to report in the BSR 602 based on the number of bytes of UL data (B1) that the UE can process between reception of the UL grant 604 at t2 and the UL data transmissions 606 at t3 (e.g., which, as noted above may be determined based on the predicted value of the slot offset).

For example, at 704 in FIG. 7, the UE may determine the amount of UL data to report in the BSR 602 to be the number of bytes of uplink data that the UE can process between reception of the uplink grant 604 and transmission of the uplink data 606 if the number of bytes of uplink data that the UE can process between reception of the uplink grant 604 and transmission of the uplink data 606 is less than an amount of uplink data in the buffer (e.g., queue) of the UE for transmission (e.g., since the UE would not be able to process all of the uplink data in the buffer of the UE for transmission before t3).

Otherwise, at 704 in FIG. 7, if the number of bytes of uplink data that the UE can process between reception of the uplink grant 604 and transmission of the uplink data 606 is greater than or equal to the amount of uplink data in the UL buffer of the UE for transmission, the UE may determine the amount of UL data to report in the BSR 602 to be the amount of uplink data in the buffer of the UE for transmission (e.g., since the UE would be able to process all of the uplink data in the buffer of the UE for transmission before t3).

Thereafter, at 706 in FIG. 7, the UE may transmit the BSR to a base station, including an indication of the amount of UL data. The BS may use the BSR to determine an amount of UL resources to allocate to the UE and may transmit an UL grant indicating the allocated resources to the UE for transmission of the UL data.

According to aspects, by taking into account the number of bytes of uplink data that the UE can process between reception of the uplink grant 604 and transmission of the uplink data 606 when determining the amount of uplink data to report in the BSR 602, the UE may avoid situations in which the UE wastes resources (e.g., allocated to the UE in the UL grant) by transmitting padding bits due to not having enough time to process the UL data between reception of the uplink grant 604 and transmission of the uplink data 606.

As noted above, in some cases, in the time between transmission of the BSR 602 at t1 and reception of the UL grant 604 at t2, the UE may not be able to finish processing of all UL data in the UL buffer due to having to compress IP packets in ROHC and/or UDC or having to compute MAC-I (e.g., if data radio bearer-integrity protection (DRB-IP) is configured), which may lead to the UE having to transmit padding bytes and wasting resources. As noted, such time between reception of the transmission of the BSR 602 and reception of the UL grant 604 may be denoted "K slots." Accordingly, if the UE were to know the value K slots before transmitting the BSR 602, the UE may be able predict how much time it has to perform the IP compression/MAC-I calculation and take such information into account when determining the amount of resources to request in the BSR 602 to more accurately determine how much UL data the UE would have to transmit at the time of transmission (e.g., t3) and, therefore, how much data to report in the BSR 602.

For example, as noted above, at 702 in FIG. 7, the UE may predict a value of a parameter related to transmission of UL data from the UE. In some cases, the parameter may comprise a number of slots occurring between transmission of the BSR and reception of an uplink grant. In other words, the UE may predict a value of the parameter K slots (e.g., pred_K) or the number of slots that the UE expects to occur between transmission of the BSR 602 and reception of an uplink grant 604. In some cases, the UE may predict the number of slots that the UE expects to occur between transmission of the BSR 602 and reception of an uplink grant 604 (e.g., pred_K) based on a machine learning algorithm, which may take into account information such as previous number of slots occurring between transmission of a previous BSR 602 and reception of a previous uplink grant 604 (e.g., a previous K slots), previous BSRs, and/or a time division duplexing (TDD) or frequency division duplexing (FDD) configuration.

The UE may then use pred_K to determine a number of bytes of uplink data that the UE can process prior to performing packet compression (B2), for example, during the time period between transmission of the BSR at t1 and reception of the UL grant 604 at t2 (e.g., K slots). The UE may then use such information to determine the amount of UL data to report in the BSR 602. For example, to determine the number of bytes of uplink data that the UE can process prior to performing packet compression (B2), the UE may first determine a compression ratio (g) related to the transmission of the uplink data from the UE. In some cases, the compression ratio may comprise a value, such as 0.9. Additionally, the UE may determine a processing speed of the UE (R2), which, in some cases, may be based on at least one of a clock rate of the UE or whether data compression in memory of the UE is active or inactive.

Thereafter, the UE may then determine the number of bytes of uplink data that the UE can process prior to performing packet compression (e.g., B2) based, at least in part, on the number of slots occurring between transmission of the BSR and reception of the uplink grant (e.g., pred_K), the processing speed of the UE (e.g., R2), and the compression ratio (e.g., g) related to the transmission of the uplink data from the UE. For example, determine the number of bytes of uplink data that the UE can process prior to performing packet compression according to: B2= (pred_K*R2)/g.

Accordingly, at 704 in FIG. 7, the UE may then determine the amount of UL data to report in the BSR 602 based on the number of bytes of uplink data that the UE can process prior to performing packet compression (e.g., B2) (e.g., which, as noted above may be determined based on the number of slots occurring between transmission of the BSR and reception of an uplink grant).

For example, at 704 in FIG. 7, the UE may determine the amount of UL data to report in the BSR 602 to be the number of bytes of uplink data that the UE can process prior to performing packet compression if the number of bytes of uplink data that the UE can process prior to performing packet compression is less than an amount of uplink data in an UL buffer of the UE for transmission (e.g., since the UE would not be able to process all of the uplink data in the buffer of the UE for transmission before t3 due to having to perform IP compression and/or MAC-I calculation).

Otherwise, at 704 in FIG. 7, if the number of bytes of uplink data that the UE can process prior to performing packet compression is greater than or equal to the amount of uplink data in the UL buffer of the UE for transmission, the UE may determine the amount of UL data to report in the BSR 602 to be the amount of uplink data in an UL buffer of the UE for transmission (e.g., since the UE would be able to process all of the uplink data in the buffer of the UE for transmission before t3 despite having to perform IP compression and/or MAC-I calculation).

Thereafter, at 706 in FIG. 7, the UE may transmit the BSR to a base station, including an indication of the amount of UL data. The BS may use the BSR to determine an amount of UL resources to allocate to the UE and may transmit an UL grant indicating the allocated resources to the UE for transmission of the UL data.

Accordingly, by taking into account the number of bytes of uplink data that the UE can process prior to performing packet compression when determining the amount of uplink data to report in the BSR 602, the UE may avoid situations in which the UE wastes resources (e.g., allocated to the UE in the UL grant) by transmitting padding bits due to not having enough time to process the UL data because of IP compression and/or MAC-I calculation.

As noted above, in some cases additional data may arrive (internally, from an application processor (AP)) at the buffer of the UE 120a for transmission to the base station 110a between transmission of the BSR 602 at t1 and reception of the UL grant 604 at t2. Traditionally, resources for this additional data would need to be requested in a future BSR, which may lead to increased latency associated with transmission of this additional data. Accordingly, if the UE were to know the amount of additional data that will arrive after transmitting the BSR 602, the UE may be able to more accurately determine how much UL data the UE would have to transmit at the time of transmission (e.g., t3) (e.g., including the additional data arriving after transmission of the BSR 602) and, therefore, how much data to report in the BSR 602 so as to avoid increased latency for transmitting the additional data arriving after transmission of the BSR 602.

For example, as noted above, at 702 in FIG. 7, the UE may predict a value of a parameter related to transmission of UL data from the UE. In some cases, the parameter may comprise a rate of additional uplink data predicted to arrive between transmission of the BSR 602 and reception of an UL grant 604. In some cases, the UE may predict the rate of the additional uplink data (e.g., denoted "pred A") arriving between transmission of the BSR 602 and reception of an UL grant 604 based on a machine learning algorithm, which may take into account information such as previous rate of the additional uplink data arriving between transmission of the BSR 602 and reception of an UL grant 604, previous BSRs, and/or a time division duplexing (TDD) or frequency division duplexing (FDD) configuration.

Thereafter, the UE may determine an amount of additional uplink data arriving between transmission of the BSR 602 and reception of an UL grant 604, which the UE may use when determining the amount of UL data to report in the BSR 602. For example, in some cases, the UE may determine the amount of additional uplink data arriving between transmission of the BSR 602 and reception of an UL grant 604 based on the rate of the additional uplink data (e.g., pred A) arriving between transmission of the BSR and reception of the uplink grant and on another predicted parameter, such as, the number of slots occurring between transmission of the BSR 602 and reception of the UL grant (e.g., pred_K). According to aspects, the UE may determine pred_K using the techniques described above.

According to aspects, by knowing (e.g., predicting) the number of slots that will occur between transmission of the BSR 602 and reception of the UL grant 604 (e.g., pred_K) and knowing the rate at which the additional data will arrive during the time between transmission of the BSR 602 and reception of the UL grant 604 (e.g., pred_K), the UE may be able to determine the amount an amount of additional uplink data arriving between transmission of the BSR 602 and reception of an UL grant 604 (e.g., pred_K). Accordingly, the UE may take into account the determined amount of additional uplink data arriving between transmission of the BSR 602 and reception of an UL grant 604 when determining the amount of UL data to report in the BSR 602.

For example, in some cases, at 704 in FIG. 7, the UE may determine the amount of uplink data to report in the BSR 602 by adding the amount of additional uplink data to an amount of UL data in the UL buffer of the UE. In other words, the amount of uplink data to report in the BSR 602 may comprise the sum of the amount of uplink data in an UL buffer of the UE for transmission and the amount of uplink data arriving between transmission of the BSR 602 and reception of an UL grant 604.

Thereafter, at 706 in FIG. 7, the UE may transmit the BSR to a base station, including an indication of the amount of UL data. The BS may use the BSR to determine an amount of UL resources to allocate to the UE and may transmit an UL grant indicating the allocated resources to the UE for transmission of the UL data.

Accordingly, by determining the amount of uplink data to report in the BSR 602 to include the amount of additional uplink data, the UE may reduce latency associated with transmission of the additional uplink data since the UE may be allocated resources (e.g., in the UL grant) for transmitting the additional UL data, for example, within the UL data transmissions at t3 in FIG. 6.

In some cases, the UE may take into account all three approaches presented above when determining the amount of uplink data to report in the BSR. In other words, when determining the amount of uplink data to report in the BSR 602, at 704 in FIG. 7, the UE may take into account (1) the number of bytes of uplink data that the UE can process between reception of the uplink grant 604 and transmission of the uplink data 606 (e.g., a first number of bytes), (2) the number of bytes of uplink data that the UE can process prior to performing packet compression between transmission of the BSR at t1 and reception of the UL grant 604 at t2 (e.g., a second number of bytes), and (3) the amount of uplink data arriving between transmission of the BSR 602 and reception of an UL grant 604.

For example, using the techniques described above, the UE may determine a first number of bytes of uplink data that the UE can process between reception of the uplink grant and transmission of the uplink data based, at least in part, on a slot offset and a processing speed of the UE.

Thereafter, the UE may determine a second number of bytes of uplink data that the UE can process prior to performing packet compression based, at least in part, on (1) the number of slots occurring between transmission of the BSR and reception of the uplink grant, (2) the processing speed of the UE, and (3) a compression ratio related to the transmission of the uplink data from the UE.

Thereafter, the UE may determine an amount of additional uplink data arriving between transmission of the BSR and reception of an uplink grant based on (1) the number of slots occurring between transmission of the BSR and reception of the uplink grant, and (2) a rate of the additional uplink data arriving between transmission of the BSR and reception of the uplink grant.

Accordingly, thereafter, in some cases, at 704 in FIG. 7, the UE may determine the amount of UL data to report in the BSR 602 as the minimum of the first number of bytes or the second number of bytes if the minimum of the first number of bytes of the second number of bytes is less than a sum of an amount of UL uplink data in an UL buffer of the UE for transmission plus the amount of additional uplink data arriving between transmission of the BSR and reception of an uplink grant. Otherwise, at 704 in FIG. 7, the UE may determine the amount of UL data to report in the BSR 602 as the a sum of the amount of uplink data in an UL buffer of the UE for transmission and the amount of additional uplink data arriving between transmission of the BSR and reception of an uplink grant if the minimum of the first number of bytes or the second number of bytes is greater than or equal to the sum of the amount of uplink data in the UL buffer of the UE for transmission and the amount of additional uplink data arriving between transmission of the BSR and reception of an uplink grant.

Additionally, as noted above, the UE may predict a value of a parameter related to transmission of uplink data from the UE using a machine learning algorithm. For example, in some cases, using the machine learning algorithm, the UE may predict the value of the parameter based on one or more of: a current buffer status, and amount of UL grant resources from the network (e.g., which may include grants across different carriers in CA), a previous scheduling delay between transmission of a previous BSR and reception of a previous uplink grant, a previous delay between reception of a previous uplink grant and transmission of uplink data based on the uplink grant (e.g., a downlink control information (DCI) to physical uplink shared channel (PUSCH) delay, such as the K2 slot offset received in DCI), whether packet compression (UDC/ROHC) is enabled or disabled, whether data radio bearer integrity protection (e.g., MAC-I) is enabled or disabled, a compression gain (e.g., associated with the packet compression), a clock frequency of the UE, central processing unit (CPU) utilization of the UE, a new data arrival rate from an application processor (AP) of the UE, a numerology associated with the UL data transmissions, a number of padding bytes, a grant in a particular leg of a split bearer, or a combination thereof. In some cases, the machine learning algorithm may configure the UE to reduce the amount of data to report in the BSR if padding bytes associated with a previous BSR were seen.

Further, in some cases, the amount of uplink data to report in the BSR 602 may correspond to a plurality of different logical channel groups (LCGs) indicated in the BSR 602. Accordingly, in some cases, the UE may need to take into account the LCGs if the amount of UL data to report in the BSR 602 is adjusted based on the techniques presented above. For example, in some cases, the amount of UL data to report in the BSR 602 may need to be decreased if the UE is not able to process all of the UL data between reception of the UL grant 604 and the UL data transmissions 606 and/or due to having to perform IP packet compression/MAC-I calculation. In other cases, when new data is expected to arrive between transmission of the BSR 602 and reception of the UL grant 604, the UE may need to increase the amount of UL data to report in the BSR 602. Accordingly, the UE may need to take into account the LCGs when increasing and decreasing the amount of data to report in the BSR 602.

In some cases, the UE may determine, at 704 in FIG. 7, the amount of uplink data to report in the BSR independently for each LCG indicated in the BSR and may transmit, at 706 in FIG. 7, the BSR including a separate indication of the determined amount of uplink data for each independent LCG.

Further, in some cases, the UE may adjust the amount of uplink data to report in the BSR uniformly for each LCG. For example, for the situation in which the UE may need to reduce the amount of data to report, in some cases, the UE may determine a difference between the amount of uplink data to report in the BSR and an amount of uplink data in the an UL buffer of the UE for transmission. Accordingly the UE may then adjust the amount of data to report in the BSR 602 by reducing the amount of data to report in the BSR 602 for each LCG uniformly by the determined difference. In the case in which additional data will arrive between transmission of the BSR 602 and reception of the UL grant 604, the UE may increase the amount of data to report in the BSR 602 for each LCG uniformly by the amount of additional data arriving between transmission of the BSR 602 and reception of the UL grant 604.

In other cases, the UE may adjust the amount of uplink data to report in the BSR for each LCG based on a priority associated with that LCG. For example, in some cases, the UE may determine one or more lower priority LCGs and reduce the amount of data to report for these lower priority LCGs until the UE meets the amount of UL data to report in the BSR 602. In some cases, the UE may reduce the lower priority LCGs based on the difference between the amount of uplink data to report in the BSR and an amount of uplink data in the an UL buffer. In other cases, when additional data will arrive between transmission of the BSR 602 and reception of the UL grant 604, the UE may increase the amount of data to report in the BSR 602 for higher priority LCGs.

Additionally, in other cases, the UE may adjust the amount of data to report in the BSR 602 by only adjusting the amount of data corresponding to a particular LCG.

Figure 8:
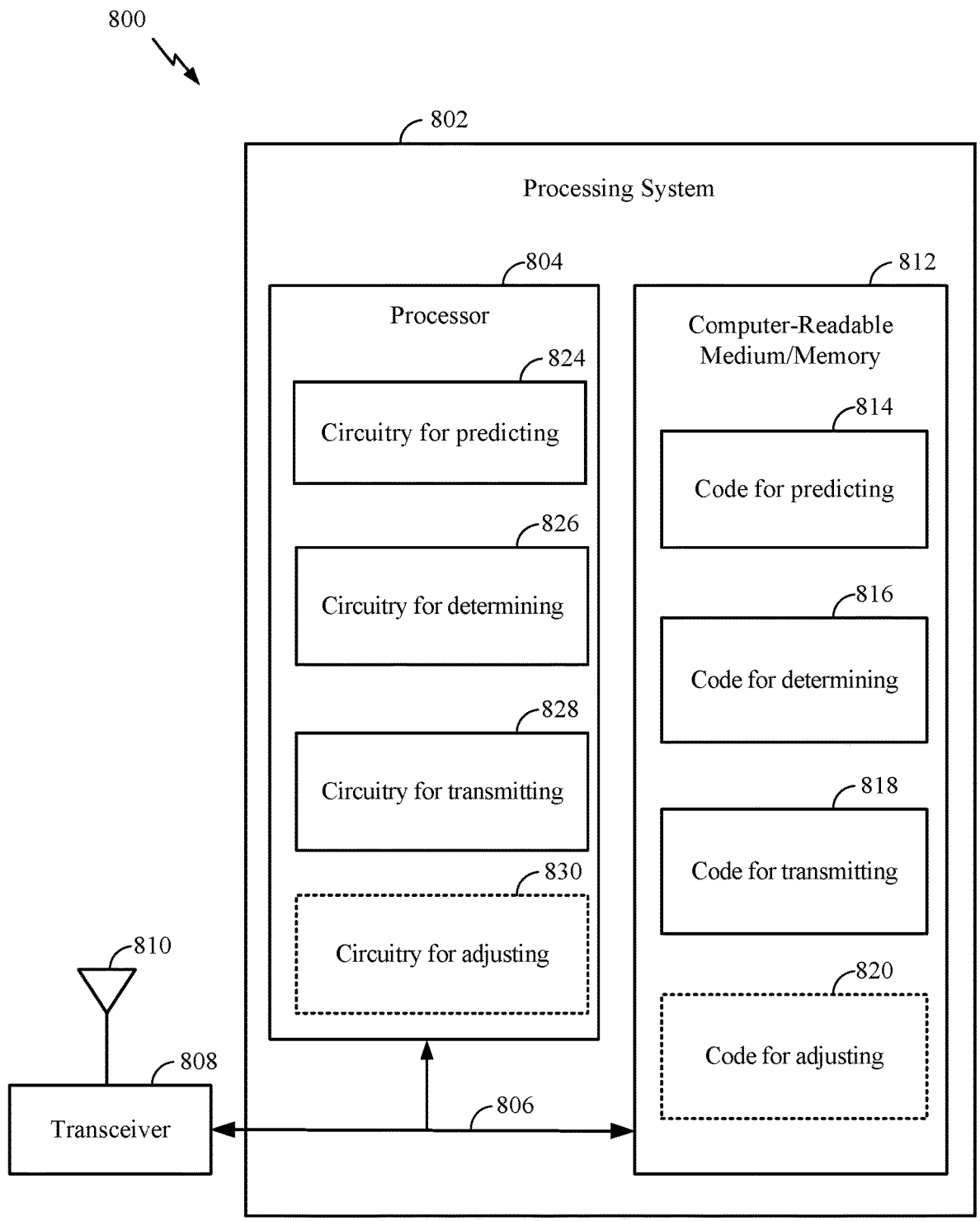
FIG. 8 illustrates a wireless node that may include various components configured to perform operations for the techniques disclosed herein in accordance with aspects of the present disclosure.

FIG. 8 illustrates a wireless node 800 that may include various components (e.g., corresponding to means-plus-function components) configured to perform operations for the techniques disclosed herein, such as the operations illustrated in FIG. 7. The wireless node 800 includes a processing system 802 coupled to a transceiver 808 (e.g., a transmitter and/or a receiver). The transceiver 808 is configured to transmit and receive signals for the wireless node 800 via an antenna 810, such as the various signals as described herein. The processing system 802 may be configured to perform processing functions for the wireless node 800, including processing signals received and/or to be transmitted by the wireless node 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 7, or other operations for performing the various techniques discussed herein for predicting uplink data to report in a buffer status report (BSR). In certain aspects, computer-readable medium/memory 812 stores code 814 for predicting, code 816 for determining, code 818 for transmitting, and code 820 for adjusting.

In some cases, the code 814 for predicting may include code for predicting a value of a parameter related to transmission of uplink data from the UE.

In some cases, the code 816 for determining may include code for determining an amount of uplink data to report in a buffer status report (BSR) based on at least the predicted value of the parameter.

In some cases, the code 818 for transmitting may include code for transmitting the BSR including an indication of the determined amount of uplink data.

In some cases, the code 818 for transmitting may include code for determining a processing speed of the UE.

In some cases, code 816 for determining may include code for determining a number of bytes of uplink data that the UE can process between reception of the uplink grant and transmission of the uplink data based, at least in part, on the slot offset and the processing speed of the UE.

In some cases, code 816 for determining may include code for determining a compression ratio related to the transmission of the uplink data from the UE.

In some cases, code 816 for determining may include code for determining a number of bytes of uplink data that the UE can process prior to performing packet compression based, at least in part, on: the number of slots occurring between transmission of the BSR and reception of the uplink grant; the processing speed of the UE; and the compression ratio related to the transmission of the uplink data from the UE.

In some cases, code 816 for determining may include code for determining an amount of additional uplink data arriving between transmission of the BSR and reception of an uplink grant based, at least in part, on: the number of slots occurring between transmission of the BSR and reception of the uplink grant; and the rate of the additional uplink data arriving between transmission of the BSR and reception of the uplink grant.

In some cases, code 816 for determining may include code for determining a first number of bytes of uplink data that the UE can process between reception of the uplink grant and transmission of the uplink data based, at least in part, on the slot offset and a processing speed of the UE.

In some cases, code 816 for determining may include code for determining a second number of bytes of uplink data that the UE can process prior to performing packet compression based, at least in part, on: the number of slots occurring between transmission of the BSR and reception of the uplink grant, the processing speed of the UE, and a compression ratio related to the transmission of the uplink data from the UE.

In some cases, code 816 for determining may include code for determining an amount of additional uplink data arriving between transmission of the BSR and reception of an uplink grant based on: the number of slots occurring between transmission of the BSR and reception of the uplink grant and a rate of the additional uplink data arriving between transmission of the BSR and reception of the uplink grant.

In some cases, code 816 for determining may include code for determining a difference between the amount of uplink data to report in the BSR and an amount of uplink data in the an UL buffer of the UE for transmission.

In some cases, code 820 for adjusting may include code for adjusting the amount of uplink data to report in the BSR uniformly for each LCG.

In some cases, code 820 for adjusting may include code for adjusting the amount of uplink data to report in the BSR for each LCG based on a priority associated with that LCG.

In certain aspects, the processor 804 may include circuitry configured to implement the code stored in the computer-readable medium/memory 812, such as for performing the operations illustrated in FIG. 7, as well as other operations described herein for predicting an amount of uplink resources to report in a BSR. For example, the processor 804 includes circuitry 824 for predicting, circuitry 826 for determining, circuitry 828 for transmitting, and circuitry 830 for adjusting.

In some cases, the circuitry 824 for predicting may include circuitry for predicting a value of a parameter related to transmission of uplink data from the UE.

In some cases, the circuitry 826 for determining may include circuitry for determining an amount of uplink data to report in a buffer status report (BSR) based on at least the predicted value of the parameter.

In some cases, the circuitry 828 for transmitting may include circuitry for transmitting the BSR including an indication of the determined amount of uplink data.

In some cases, the circuitry 828 for transmitting may include circuitry for determining a processing speed of the UE.

In some cases, circuitry 826 for determining may include circuitry for determining a number of bytes of uplink data that the UE can process between reception of the uplink grant and transmission of the uplink data based, at least in part, on the slot offset and the processing speed of the UE.

In some cases, circuitry 826 for determining may include circuitry for determining a compression ratio related to the transmission of the uplink data from the UE.

In some cases, circuitry 826 for determining may include circuitry for determining a number of bytes of uplink data that the UE can process prior to performing packet compression based, at least in part, on: the number of slots occurring between transmission of the BSR and reception of the uplink grant; the processing speed of the UE; and the compression ratio related to the transmission of the uplink data from the UE.

In some cases, circuitry 826 for determining may include circuitry for determining an amount of additional uplink data arriving between transmission of the BSR and reception of an uplink grant based, at least in part, on: the number of slots occurring between transmission of the BSR and reception of the uplink grant; and the rate of the additional uplink data arriving between transmission of the BSR and reception of the uplink grant.

In some cases, circuitry 826 for determining may include circuitry for determining a first number of bytes of uplink data that the UE can process between reception of the uplink grant and transmission of the uplink data based, at least in part, on the slot offset and a processing speed of the UE.

In some cases, circuitry 826 for determining may include circuitry for determining a second number of bytes of uplink data that the UE can process prior to performing packet compression based, at least in part, on: the number of slots occurring between transmission of the BSR and reception of the uplink grant, the processing speed of the UE, and a compression ratio related to the transmission of the uplink data from the UE.

In some cases, circuitry 826 for determining may include circuitry for determining an amount of additional uplink data arriving between transmission of the BSR and reception of an uplink grant based on: the number of slots occurring between transmission of the BSR and reception of the uplink grant and a rate of the additional uplink data arriving between transmission of the BSR and reception of the uplink grant.

In some cases, circuitry 826 for determining may include circuitry for determining a difference between the amount of uplink data to report in the BSR and an amount of uplink data in the an UL buffer of the UE for transmission.

In some cases, circuitry 830 for adjusting may include circuitry for adjusting the amount of uplink data to report in the BSR uniformly for each LCG.

In some cases, circuitry 830 for adjusting may include circuitry for adjusting the amount of uplink data to report in the BSR for each LCG based on a priority associated with that LCG.

EXAMPLE EMBODIMENTS

Embodiment 1: A method for wireless communication by a user equipment (UE), comprising: predicting a value of a parameter related to transmission of uplink data from the UE, determining an amount of uplink data to report in a buffer status report (BSR) based on at least the predicted value of the parameter, and transmitting the BSR including an indication of the determined amount of uplink data.

Embodiment 2: The method of Embodiment 1, wherein the parameter related to the transmission of the uplink data is predicted based on a machine learning algorithm.

Embodiment 3: The method of Embodiments 1 or 2, wherein the parameter comprises at least one of: a slot offset indicating a number of slots between reception of an uplink grant and transmission of the uplink data, a number of slots occurring between transmission of the BSR and reception of an uplink grant, or a rate of additional uplink data arriving between transmission of the BSR and reception of an uplink grant.

Embodiment 4: The method of Embodiment 3, wherein the slot offset is predicted based on a previous slot offset.

Embodiment 5: The method of Embodiments 3 or 4, wherein the number of slots occurring between transmission of the BSR and reception of the uplink grant is predicted based on a previous number of slots occurring between transmission of a previous BSR and reception of a previous uplink grant.

Embodiment 6: The method of any of Embodiments 3-5, wherein the rate of the additional uplink data arriving between transmission of the BSR and reception of an uplink grant is predicted based on a previous rate of additional uplink data arriving between transmission of a previous BSR and reception of a previous uplink grant.

Embodiment 7: The method of any of Embodiments 3-6, wherein the parameter is predicted based on at least one of: a previous BSR or a time division duplexing (TDD) or frequency division duplexing (FDD) configuration.

Embodiment 8: The method of any of Embodiments 3-7, further comprising determining a processing speed of the UE.

Embodiment 9: The method of Embodiment 8, wherein the processing speed of the UE represents the number of bytes of uplink data the UE can process per slot.

Embodiment 10: The method of Embodiment 8 or 9, wherein the processing speed of the UE is determined based on at least one of a clock rate of the UE or whether data compression in memory of the UE is active or inactive.

Embodiment 11: The method of any of Embodiments 8-10, further comprising determining a number of bytes of uplink data that the UE can process between reception of the uplink grant and transmission of the uplink data based, at least in part, on the slot offset and the processing speed of the UE.

Embodiment 12: The method of Embodiment 11, wherein the amount of uplink data to report in the BSR comprises one of: the number of bytes of uplink data that the UE can process between reception of the uplink grant and transmission of the uplink data if the number of bytes of uplink data that the UE can process between reception of the uplink grant and transmission of the uplink data is less than an amount of uplink data in an UL buffer of the UE for transmission; or an amount of uplink data in an UL buffer of the UE for transmission if the number of bytes of uplink data that the UE can process between reception of the uplink grant and transmission of the uplink data is greater than or equal to the amount of uplink data in the UL buffer of the UE for transmission.

Embodiment 13. The method of any of Embodiments 8-12, further comprising determining a compression ratio related to the transmission of the uplink data from the UE.

Embodiment 14: The method of Embodiment 13, further comprising determining a number of bytes of uplink data that the UE can process prior to performing packet compression based, at least in part, on: the number of slots occurring between transmission of the BSR and reception of the uplink grant, the processing speed of the UE, and the compression ratio related to the transmission of the uplink data from the UE.

Embodiment 15: The method of Embodiment 14, wherein the amount of uplink data to report in the BSR comprises one of: the number of bytes of uplink data that the UE can process prior to performing packet compression if the number of bytes of uplink data that the UE can process prior to performing packet compression is less than an amount of uplink data in an UL buffer of the UE for transmission; or an amount of uplink data in an UL buffer of the UE for transmission if the number of bytes of uplink data that the UE can process prior to performing packet compression is greater than or equal to the amount of uplink data in the UL buffer of the UE for transmission.

Embodiment 16. The method of and of Embodiments 3-15, further comprising determining an amount of additional uplink data arriving between transmission of the BSR and reception of an uplink grant based, at least in part, on: the number of slots occurring between transmission of the BSR and reception of the uplink grant and the rate of the additional uplink data arriving between transmission of the BSR and reception of the uplink grant.

Embodiment 17: The method of Embodiment 16, wherein the amount of uplink data to report in the BSR comprises a sum of an amount of uplink data in an UL buffer of the UE for transmission and the amount of uplink data arriving between transmission of the BSR and reception of an uplink grant.

Embodiment 18: The method of any of Embodiments 3-17, further comprising: determining a first number of bytes of uplink data that the UE can process between reception of the uplink grant and transmission of the uplink data based, at least in part, on the slot offset and a processing speed of the UE; determining a second number of bytes of uplink data that the UE can process prior to performing packet compression based, at least in part, on: the number of slots occurring between transmission of the BSR and reception of the uplink grant; the processing speed of the UE; and a compression ratio related to the transmission of the uplink data from the UE; and determining an amount of additional uplink data arriving between transmission of the BSR and reception of an uplink grant based on: the number of slots occurring between transmission of the BSR and reception of the uplink grant; and a rate of the additional uplink data arriving between transmission of the BSR and reception of the uplink grant.

Embodiment 19: The method of Embodiment 18, wherein the amount of uplink data to report in the BSR comprises one of: a minimum of the first number of bytes or the second number of bytes if the minimum of the first number of bytes of the second number of bytes is less than a sum of an amount of UL uplink data in an UL buffer of the UE for transmission plus the amount of additional uplink data arriving between transmission of the BSR and reception of an uplink grant; or a sum of the amount of uplink data in an UL buffer of the UE for transmission and the amount of additional uplink data arriving between transmission of the BSR and reception of an uplink grant if a minimum of the first number of bytes or the second number of bytes is greater than or equal to the sum of the amount of uplink data in the UL buffer of the UE for transmission and the amount of additional uplink data arriving between transmission of the BSR and reception of an uplink grant.

Embodiment 20: The method of any of Embodiments 1-19, wherein the amount of uplink data to report in the BSR corresponds to a plurality of different logical channel groups (LCGs) indicated in the BSR.

Embodiment 21: The method of Embodiment 20, further comprising determining a difference between the amount of uplink data to report in the BSR and an amount of uplink data in an UL buffer of the UE for transmission.

Embodiment 22: The method of Embodiment 21, further comprising: adjusting the amount of uplink data to report in the BSR uniformly for each LCG or adjusting the amount of uplink data to report in the BSR for each LCG based on a priority associated with that LCG.

Embodiment 23: The method of any of Embodiments 1-22, wherein the parameter is predicted based on at least one of: a current buffer status; an amount of uplink grant resources; a previous scheduling delay between transmission of a previous BSR and reception of a previous uplink grant; a previous delay between reception of a previous uplink grant and transmission of uplink data based on the uplink grant; whether packet compression is enabled or disabled; whether data radio bearer integrity protection is enabled or disabled; a compression gain associated with packet compression; a clock frequency of the UE; central processing unit (CPU) utilization or the UE; a previous new data arrival rate from an application processor of the UE; a numerology associated with the transmission of the uplink data; a number of padding bytes; a grant in a particular leg of a split bearer; or a combination thereof.

Embodiment 24: An apparatus for wireless communication by a user equipment (UE), comprising: at least one processor configured to: predict a value of a parameter related to transmission of uplink data from the UE, determine an amount of uplink data to report in a buffer status report (BSR) based on at least the predicted value of the parameter, and transmit the BSR including an indication of the determined amount of uplink data; and a memory coupled with the at least one processor.

Embodiment 25: The apparatus of Embodiment 24, wherein the at least one processor is configured to predict the parameter related to the transmission of the uplink data based on a machine learning algorithm.

Embodiment 26: The apparatus of Embodiments 24 or 25, wherein the parameter comprises at least one of: a slot offset indicating a number of slots between reception of an uplink grant and transmission of the uplink data, a number of slots occurring between transmission of the BSR and reception of an uplink grant, or a rate of additional uplink data arriving between transmission of the BSR and reception of an uplink grant.

Embodiment 27: The apparatus of Embodiment 26, wherein the slot offset is predicted based on a previous slot offset.

Embodiment 28: The apparatus of Embodiments 26 or 27, wherein the number of slots occurring between transmission of the BSR and reception of the uplink grant is predicted based on a previous number of slots occurring between transmission of a previous BSR and reception of a previous uplink grant.

Embodiment 29: The apparatus of any of Embodiments 26-28, wherein the rate of the additional uplink data arriving between transmission of the BSR and reception of an uplink grant is predicted based on a previous rate of additional uplink data arriving between transmission of a previous BSR and reception of a previous uplink grant.

Embodiment 30: The apparatus of any of Embodiments 26-29, wherein the parameter is predicted based on at least one of: a previous BSR or a time division duplexing (TDD) or frequency division duplexing (FDD) configuration.

Embodiment 31: The apparatus of any of Embodiments 26-30, wherein the at least one processor is further configured to determine a processing speed of the UE.

Embodiment 32: The apparatus of Embodiment 31, wherein the processing speed of the UE represents the number of bytes of uplink data the UE can process per slot.

Embodiment 33: The apparatus of Embodiment 31 or 32, wherein the processing speed of the UE is determined based on at least one of a clock rate of the UE or whether data compression in memory of the UE is active or inactive.

Embodiment 34: The apparatus of any of Embodiments 31-33, wherein the at least one processor is further configured to determine a number of bytes of uplink data that the UE can process between reception of the uplink grant and transmission of the uplink data based, at least in part, on the slot offset and the processing speed of the UE.

Embodiment 35: The apparatus of Embodiment 34, wherein the amount of uplink data to report in the BSR comprises one of: the number of bytes of uplink data that the UE can process between reception of the uplink grant and transmission of the uplink data if the number of bytes of uplink data that the UE can process between reception of the uplink grant and transmission of the uplink data is less than an amount of uplink data in an UL buffer of the UE for transmission; or an amount of uplink data in an UL buffer of the UE for transmission if the number of bytes of uplink data that the UE can process between reception of the uplink grant and transmission of the uplink data is greater than or equal to the amount of uplink data in the UL buffer of the UE for transmission.

Embodiment 36: The apparatus of any of Embodiments 31-35, wherein the at least one processor is further configured to determine a compression ratio related to the transmission of the uplink data from the UE.

Embodiment 37: The apparatus of Embodiment 36, wherein the at least one processor is further configured to determine a number of bytes of uplink data that the UE can process prior to performing packet compression based, at least in part, on: the number of slots occurring between transmission of the BSR and reception of the uplink grant, the processing speed of the UE, and the compression ratio related to the transmission of the uplink data from the UE.

Embodiment 38: The apparatus of Embodiment 37, wherein the amount of uplink data to report in the BSR comprises one of: the number of bytes of uplink data that the UE can process prior to performing packet compression if the number of bytes of uplink data that the UE can process prior to performing packet compression is less than an amount of uplink data in an UL buffer of the UE for transmission; or an amount of uplink data in an UL buffer of the UE for transmission if the number of bytes of uplink data that the UE can process prior to performing packet compression is greater than or equal to the amount of uplink data in the UL buffer of the UE for transmission.

Embodiment 39: The apparatus of and of Embodiments 26-38, wherein the at least one processor is further configured to determine an amount of additional uplink data arriving between transmission of the BSR and reception of an uplink grant based, at least in part, on: the number of slots occurring between transmission of the BSR and reception of the uplink grant and the rate of the additional uplink data arriving between transmission of the BSR and reception of the uplink grant.

Embodiment 40: The apparatus of Embodiment 39, wherein the amount of uplink data to report in the BSR comprises a sum of an amount of uplink data in an UL buffer of the UE for transmission and the amount of uplink data arriving between transmission of the BSR and reception of an uplink grant.

Embodiment 41: The apparatus of any of Embodiments 26-40, wherein the at least one processor is further configured to: determine a first number of bytes of uplink data that the UE can process between reception of the uplink grant and transmission of the uplink data based, at least in part, on the slot offset and a processing speed of the UE; determine a second number of bytes of uplink data that the UE can process prior to performing packet compression based, at least in part, on: the number of slots occurring between transmission of the BSR and reception of the uplink grant; the processing speed of the UE; and a compression ratio related to the transmission of the uplink data from the UE; and determine an amount of additional uplink data arriving between transmission of the BSR and reception of an uplink grant based on: the number of slots occurring between transmission of the BSR and reception of the uplink grant; and a rate of the additional uplink data arriving between transmission of the BSR and reception of the uplink grant.

Embodiment 42: The apparatus of Embodiment 41, wherein the amount of uplink data to report in the BSR comprises one of: a minimum of the first number of bytes or the second number of bytes if the minimum of the first number of bytes of the second number of bytes is less than a sum of an amount of UL uplink data in an UL buffer of the UE for transmission plus the amount of additional uplink data arriving between transmission of the BSR and reception of an uplink grant; or a sum of the amount of uplink data in an UL buffer of the UE for transmission and the amount of additional uplink data arriving between transmission of the BSR and reception of an uplink grant if a minimum of the first number of bytes or the second number of bytes is greater than or equal to the sum of the amount of uplink data in the UL buffer of the UE for transmission and the amount of additional uplink data arriving between transmission of the BSR and reception of an uplink grant.

Embodiment 43: The apparatus of any of Embodiments 24-42, wherein the amount of uplink data to report in the BSR corresponds to a plurality of different logical channel groups (LCGs) indicated in the BSR.

Embodiment 44: The apparatus of Embodiment 43, further comprising determining a difference between the amount of uplink data to report in the BSR and an amount of uplink data in an UL buffer of the UE for transmission.

Embodiment 45: The apparatus of Embodiment 44, wherein the at least one processor is further configured to: adjust the amount of uplink data to report in the BSR uniformly for each LCG or adjust the amount of uplink data to report in the BSR for each LCG based on a priority associated with that LCG.

Embodiment 46: The apparatus of any of Embodiments 24-45, wherein the parameter is predicted based on at least one of: a current buffer status; an amount of uplink grant resources; a previous scheduling delay between transmission of a previous BSR and reception of a previous uplink grant; a previous delay between reception of a previous uplink grant and transmission of uplink data based on the uplink grant; whether packet compression is enabled or disabled; whether data radio bearer integrity protection is enabled or disabled; a compression gain associated with packet compression; a clock frequency of the UE; central processing unit (CPU) utilization or the UE; a previous new data arrival rate from an application processor of the UE; a numerology associated with the transmission of the uplink data; a number of padding bytes; a grant in a particular leg of a split bearer; or a combination thereof.

Embodiment 47: An apparatus for wireless communication by a user equipment (UE), comprising: means for predicting a value of a parameter related to transmission of uplink data from the UE, means for determining an amount of uplink data to report in a buffer status report (BSR) based on at least the predicted value of the parameter, and means for transmitting the BSR including an indication of the determined amount of uplink data.

Embodiment 48: A non-transitory computer-readable medium for wireless communication by a user equipment (UE), comprising: instructions that, when executed by at least one processor, cause the at least one processor to: predict a value of a parameter related to transmission of uplink data from the UE, determine an amount of uplink data to report in a buffer status report (BSR) based on at least the predicted value of the parameter, and transmit the BSR including an indication of the determined amount of uplink data.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a wireless node, a wireless communications node, a wireless device, a wireless communications device, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7, as well as other operations described herein for predicting an amount of uplink data to report in a buffer status report (BSR).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   predicting a value of a parameter related to transmission of uplink data from the UE based on a time division duplexing (TDD) or frequency division duplexing (FDD) configuration;
   determining an amount of uplink data to report in a subsequent buffer status report (BSR based on at least the predicted value of the parameter; and
   transmitting the subsequent BSR including an indication of the determined amount of uplink data.

2. The method of claim 1, wherein the parameter related to the transmission of the uplink data is predicted based on a machine learning algorithm.

3. The method of claim 1, wherein the parameter comprises at least one of:
   a slot offset indicating a number of slots between reception of an uplink grant and transmission of the uplink data;
   a number of slots occurring between transmission of the subsequent BSR and reception of an uplink grant; or a rate of additional uplink data arriving between transmission of the subsequent BSR and reception of an uplink grant.

4. The method of claim 3, wherein the slot offset is predicted based on a previous slot offset.

5. The method of claim 3, wherein the number of slots occurring between transmission of the subsequent BSR and reception of the uplink grant is predicted based on a previous number of slots occurring between transmission of a previous BSR and reception of a previous uplink grant.

6. The method of claim 3, wherein the rate of the additional uplink data arriving between transmission of the subsequent BSR and reception of an uplink grant is predicted based on a previous rate of additional uplink data arriving between transmission of a previous BSR and reception of a previous uplink grant.

7. The method of claim 3, further comprising determining a processing speed of the UE.

8. The method of claim 7, wherein the processing speed of the UE represents a number of bytes of uplink data the UE can process per slot.

9. The method of claim 7, wherein the processing speed of the UE is determined based on at least one of a clock rate of the UE or whether data compression in memory of the UE is active or inactive.

10. The method of claim 7, further comprising determining a number of bytes of uplink data that the UE can process between reception of the uplink grant and transmission of the uplink data based, at least in part, on the slot offset and the processing speed of the UE.

11. The method of claim 10, wherein the amount of uplink data to report in the subsequent BSR comprises one of:
the number of bytes of uplink data that the UE can process between reception of the uplink grant and transmission of the uplink data if the number of bytes of uplink data that the UE can process between reception of the uplink grant and transmission of the uplink data is less than an amount of uplink data in an UL buffer of the UE for transmission; or
an amount of uplink data in an UL buffer of the UE for transmission if the number of bytes of uplink data that the UE can process between reception of the uplink grant and transmission of the uplink data is greater than or equal to the amount of uplink data in the UL buffer of the UE for transmission.

12. The method of claim 7, further comprising determining a compression ratio related to the transmission of the uplink data from the UE.

13. The method of claim 12, further comprising determining a number of bytes of uplink data that the UE can process prior to performing packet compression based, at least in part, on:
the number of slots occurring between transmission of the subsequent BSR and reception of the uplink grant;
the processing speed of the UE; and
the compression ratio related to the transmission of the uplink data from the UE.

14. The method of claim 13, wherein the amount of uplink data to report in the subsequent BSR comprises one of:
the number of bytes of uplink data that the UE can process prior to performing packet compression if the number of bytes of uplink data that the UE can process prior to performing packet compression is less than an amount of uplink data in an UL buffer of the UE for transmission; or
an amount of uplink data in an UL buffer of the UE for transmission if the number of bytes of uplink data that the UE can process prior to performing packet compression is greater than or equal to the amount of uplink data in the UL buffer of the UE for transmission.

15. The method of claim 3, further comprising determining an amount of additional uplink data arriving between transmission of the subsequent BSR and reception of an uplink grant based, at least in part, on:
the number of slots occurring between transmission of the subsequent BSR and reception of the uplink grant; and
the rate of the additional uplink data arriving between transmission of the BSR and reception of the uplink grant.

16. The method of claim 15, wherein the amount of uplink data to report in the subsequent BSR comprises a sum of an amount of uplink data in an UL buffer of the UE for transmission and the amount of uplink data arriving between transmission of the subsequent BSR and reception of an uplink grant.

17. The method of claim 3, further comprising:
determining a first number of bytes of uplink data that the UE can process between reception of the uplink grant and transmission of the uplink data based, at least in part, on the slot offset and a processing speed of the UE;
determining a second number of bytes of uplink data that the UE can process prior to performing packet compression based, at least in part, on:
the number of slots occurring between transmission of the subsequent BSR and reception of the uplink grant;
the processing speed of the UE; and
a compression ratio related to the transmission of the uplink data from the UE; and
determining an amount of additional uplink data arriving between transmission of the subsequent BSR and reception of an uplink grant based on:
the number of slots occurring between transmission of the subsequent BSR and reception of the uplink grant; and
a rate of the additional uplink data arriving between transmission of the subsequent BSR and reception of the uplink grant.

18. The method of claim 17, wherein the amount of uplink data to report in the subsequent BSR comprises one of:
a minimum of the first number of bytes or the second number of bytes if the minimum of the first number of bytes of the second number of bytes is less than a sum of an amount of UL uplink data in an UL buffer of the UE for transmission plus the amount of additional uplink data arriving between transmission of the subsequent BSR and reception of an uplink grant; or
a sum of the amount of uplink data in an UL buffer of the UE for transmission and the amount of additional uplink data arriving between transmission of the subsequent BSR and reception of an uplink grant if a minimum of the first number of bytes or the second number of bytes is greater than or equal to the sum of the amount of uplink data in the UL buffer of the UE for transmission and the amount of additional uplink data arriving between transmission of the subsequent BSR and reception of an uplink grant.

19. The method of claim 1, wherein the amount of uplink data to report in the subsequent BSR corresponds to a plurality of different logical channel groups (LCGs) indicated in the subsequent BSR.

20. The method of claim 19, further comprising:
determining a difference between the amount of uplink data to report in the subsequent BSR and an amount of uplink data in an UL buffer of the UE for transmission; and
one of:
adjusting the amount of uplink data to report in the subsequent BSR uniformly for each LCG based on the difference between the amount of uplink data to report in the subsequent BSR and an amount of uplink data in an UL buffer of the UE for transmission; or
adjusting the amount of uplink data to report in the subsequent BSR for each LCG based on a priority associated with that LCG based on the difference between the amount of uplink data to report in the subsequent BSR and an amount of uplink data in an UL buffer of the UE for transmission.

21. The method of claim 19, wherein:
determining the amount of uplink data to report in the subsequent BSR comprises determining the amount of uplink data to report independently for each LCG indicated in the subsequent BSR; and
transmitting the subsequent BSR including the indication of the determined amount of uplink data comprises transmitting a separate indication of the determined amount of uplink data for each independent LCG.

22. The method of claim 1, wherein the parameter is predicted based on at least one of:
a current buffer status;
an amount of uplink grant resources;
a previous scheduling delay between transmission of the previous BSR and reception of a previous uplink grant;
a previous delay between reception of a previous uplink grant and transmission of uplink data based on the uplink grant;
whether packet compression is enabled or disabled;
whether data radio bearer integrity protection is enabled or disabled;
a compression gain associated with packet compression;
a clock frequency of the UE;
central processing unit (CPU) utilization or the UE;
a previous new data arrival rate from an application processor of the UE;
a numerology associated with the transmission of the uplink data;
a number of padding bytes;
a grant in a particular leg of a split bearer; or
a combination thereof.

23. The method of claim 1, wherein the value of the parameter is further predicted based on information in a previous buffer status report (BSR).

24. An apparatus for wireless communication by a user equipment (UE), comprising:
at least one processor configured to:
predict a value of a parameter related to transmission of uplink data from the UE based on a time division duplexing (TDD) or frequency division duplexing (FDD) configuration;
determine an amount of uplink data to report in a subsequent buffer status report (BSR) based on at least the predicted value of the parameter; and
transmit the subsequent BSR including an indication of the determined amount of uplink data; and
a memory coupled with the at least one processor.

25. The apparatus of claim 24, wherein the at least one processor is further configured to predict the parameter related to the transmission of the uplink data based on a machine learning algorithm.

26. The apparatus of claim 24, wherein the parameter comprises at least one of:
a slot offset indicating a number of slots between reception of an uplink grant and transmission of the uplink data;
a number of slots occurring between transmission of the subsequent BSR and reception of an uplink grant; or
a rate of additional uplink data arriving between transmission of the subsequent BSR and reception of an uplink grant.

27. The apparatus of claim 26, wherein the at least one processor is further configured to:
determine a first number of bytes of uplink data that the UE can process between reception of the uplink grant and transmission of the uplink data based, at least in part, on the slot offset and a processing speed of the UE;
determine a second number of bytes of uplink data that the UE can process prior to performing packet compression based, at least in part, on:
the number of slots occurring between transmission of the subsequent BSR and reception of the uplink grant;
the processing speed of the UE; and
a compression ratio related to the transmission of the uplink data from the UE; and
determine an amount of additional uplink data arriving between transmission of the subsequent BSR and reception of an uplink grant based on:
the number of slots occurring between transmission of the subsequent BSR and reception of the uplink grant; and
a rate of the additional uplink data arriving between transmission of the subsequent BSR and reception of the uplink grant.

28. The apparatus of claim 27, wherein the amount of uplink data to report in the subsequent BSR comprises one of:
a minimum of the first number of bytes or the second number of bytes if the minimum of the first number of bytes of the second number of bytes is less than a sum of an amount of UL uplink data in an UL buffer of the UE for transmission plus the amount of additional uplink data arriving between transmission of the subsequent BSR and reception of an uplink grant; or
a sum of the amount of uplink data in an UL buffer of the UE for transmission and the amount of additional uplink data arriving between transmission of the subsequent BSR and reception of an uplink grant if a minimum of the first number of bytes or the second number of bytes is greater than or equal to the sum of the amount of uplink data in the UL buffer of the UE for transmission and the amount of additional uplink data arriving between transmission of the subsequent BSR and reception of an uplink grant.

29. An apparatus for wireless communication by a user equipment (UE), comprising:
means for predicting a value of a parameter related to transmission of uplink data from the UE, wherein the means for predicting are configured to predict the value of the parameter related to the transmission of the uplink data based on a time division duplexing (TDD) or frequency division duplexing (FDD) configuration;

means for determining an amount of uplink data to report in a subsequent buffer status report (BSR) based on at least the predicted value of the parameter; and means for transmitting the subsequent BSR including an indication of the determined amount of uplink data.

30. A non-transitory computer-readable medium for wireless communication by a user equipment (UE), comprising: instructions that, when executed by at least one processor, cause the at least one processor to:

predict a value of a parameter related to transmission of uplink data from the UE, wherein the instructions cause the at least one processor to predict the value of the parameter related to the transmission of the uplink data based on a time division duplexing (TDD) or frequency division duplexing (FDD) configuration;

determine an amount of uplink data to report in a subsequent buffer status report (BSR) based on at least the predicted value of the parameter; and transmit the subsequent BSR including an indication of the determined amount of uplink data.

* * * * *